United States Patent [19]

Russell et al.

[11] Patent Number: 5,040,843

[45] Date of Patent: Aug. 20, 1991

[54] ROLL-UP PICKUP BED COVER WITH INTEGRAL TAILGATE COVER AND LOCK

[75] Inventors: Edward Russell, Arlington; Ronald W. Hopkins, Dallas, both of Tex.

[73] Assignee: E. L. "Jack" Shockey, Dallas, Tex.

[21] Appl. No.: 473,652

[22] Filed: Feb. 1, 1990

[51] Int. Cl.⁵ ............................................. B60J 7/04
[52] U.S. Cl. ................................... 296/98; 296/100; 160/23.1; 160/133; 160/310; 74/89.21; 74/207; 74/421 A; 74/625
[58] Field of Search .............. 296/98, 100; 160/23.1, 160/26, 33, 133, 290.1, 310; 74/625, 89.21, 384, 341, 207, 421 A

[56] References Cited

U.S. PATENT DOCUMENTS

| | | | |
|---|---|---|---|
| 688,838 | 12/1901 | Dorsey | 74/207 X |
| 3,858,452 | 1/1975 | Gatland et al. | 49/139 X |
| 3,905,442 | 9/1975 | O'Neill, Jr. | 74/207 X |
| 3,909,980 | 10/1975 | Courtney et al. | 49/139 X |
| 3,978,936 | 9/1976 | Schwartz | 74/207 X |
| 4,563,034 | 1/1986 | Lamb | 296/98 |
| 4,611,848 | 9/1986 | Romano | 296/98 |
| 4,786,099 | 11/1988 | Mount | 296/98 |
| 4,795,206 | 1/1989 | Adams | 296/98 |
| 4,807,921 | 2/1989 | Champie, III et al. | 296/100 X |
| 4,889,381 | 12/1989 | Tamblyn et al. | 296/98 |

*Primary Examiner*—Margaret A. Focarino
*Assistant Examiner*—Andrew C. Pike
*Attorney, Agent, or Firm*—Daniel V. Thompson

[57] ABSTRACT

A cover for an open-bodied truck is movable between retracted and extended positions. A pair of guides are mounted on the side walls of the open body, and a cover assembly includes a plurality of rectangular panels linked to one another and extending across the open body. End portions of the panels are slidably mounted in the guides. A drive mechanism is provided for translating the cover assembly between the retracted and extended positions, and an enclosure is mounted at the forward end of the open body for receiving and storing the cover assembly in its retracted position. The tailgate of the open body is maintained in a closed and locked condition when the cover assembly is in its fully extended position.

5 Claims, 5 Drawing Sheets

ROLL-UP PICKUP BED COVER WITH INTEGRAL TAILGATE COVER AND LOCK

TECHNICAL FIELD

Our invention relates to motor vehicles, and more particularly to a sliding cover assembly for an open bodied pickup truck.

BACKGROUND OF THE INVENTION

It has long been known that a sliding cover assembly for converting the open body of a pickup truck to a closed body is advantageous. The sliding cover, when closed, provides protection of the contents of the truck from bad weather and from unintended access. In addition, a closed truck bed reduces fuel consumption by reducing wind resistance. Moreover, the provision of a cover over the truck bed reduces the risk of cargo being lost due to strong airflows across the truck bed while the truck is moving. With the cover retracted such that the body is open, the truck is available to be used to transport large and bulky objects that would not be transportable in the closed body of the truck.

A sliding cover assembly mounted on a pair of tracks fixed to the upper side walls of a truck body is known, as shown in U.S. Pat. No. 4,611,848 to Romano. Such prior art cover assembly includes side wall tracks having lengthwise channels communicating with the interior space of the open body, with a retractable cover being slidably mounted in the tracks. The cover is translated forward to uncover the body and rearward to cover the body. The cover is stowed in the forward portion of the body by winding the cover upon a spring-loaded drum. As the cover is pulled rearwardly, the spring resists movement such that upon release from the extended position, the spring pulls the cover back into the retracted position. This mechanical, spring-operated system is unwieldly in use, expensive and difficult to manufacture.

U.S. Pat. No. 4,210,361 to Marvin et al also discloses a cover assembly which rolls up on a drum pursuant to spring tension. The Marvin et al cover also includes a latch on the end of the cover having outwardly extending plungers to engage tangs specially formed on the truck tailgate and matching holes in the guiderails. This locking mechanism is mechanically complicated and requires modifications to the vehicle.

Thus it can be seen that there is no simple and economically manufactured sliding pickup bed cover currently available. The ideal cover would be free from complex mechanical storage mechanisms, and enable automatic locking of the cover and the tailgate upon full extension of the cover.

SUMMARY OF THE INVENTION

Our invention provides a sliding cover for use with a pickup truck having an open body with a tailgate hingedly mounted to the rear end of the body. A pair of guides are mounted on the upper portion of the side walls of the open body, each guide including a lengthwise channel communicating with the interior space of the open body. A cover assembly includes a plurality of rectangular panels linked to one another and having end portions slidably mounted in the channels. A drive mechanism is provided to transport the cover assembly between a fully extended position and a retracted position, with an enclosure being provided at the forward end of the open body to receive and maintain the cover in its retracted position. The tailgate is automatically locked when the cover is fully extended by a tailgate cover which rotates to prevent opening of the tailgate. The drive mechanism is configured such that the cover assembly is locked when the drive means is de-energized.

BRIEF DESCRIPTION OF THE DRAWINGS

A more complete understanding of our invention and its advantages will be apparent from the Detailed Description taken in conjunction with the accompanying Drawings in which.

DETAILED DESCRIPTION OF THE PREFERRED EMBODIMENT

Figure 1:
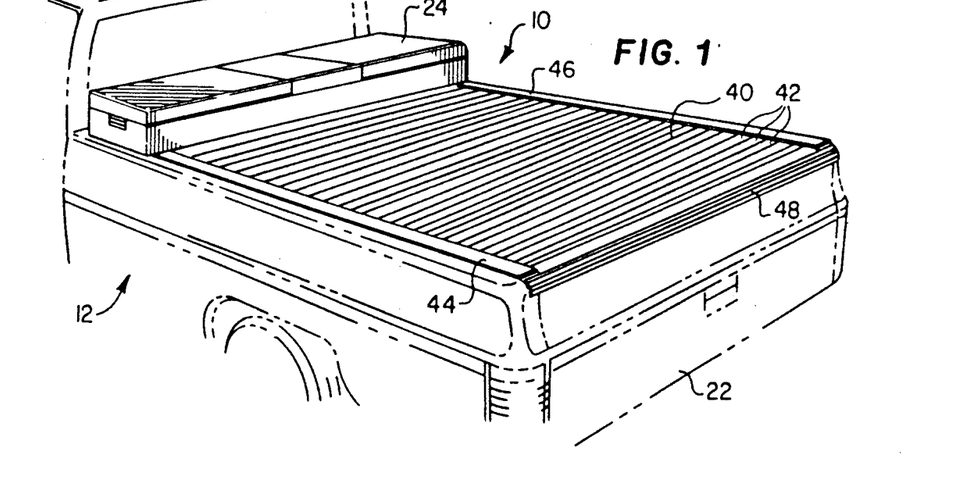
FIG. 1 is a partial perspective view of a cover constructed in accordance with the invention installed on a pickup truck body and shown in the fully extended position.
Figure 2:
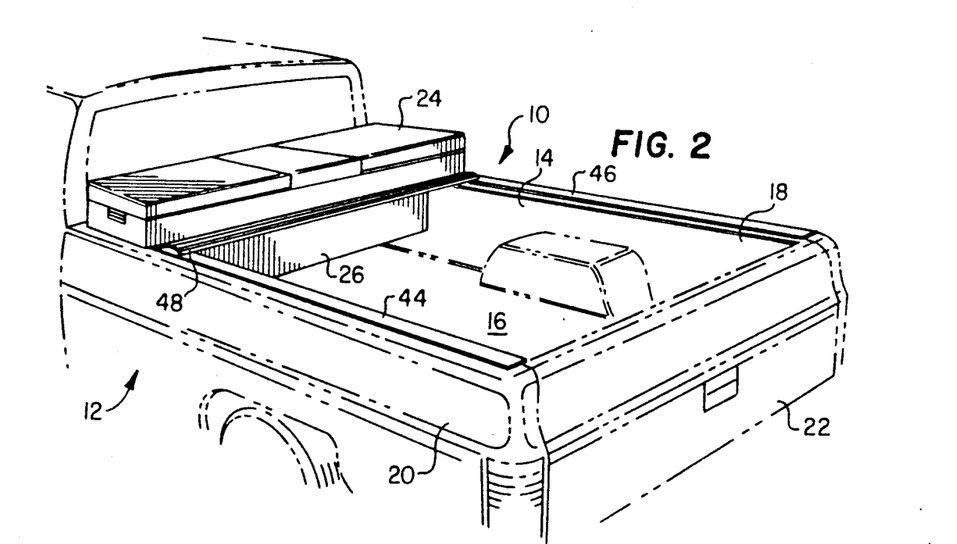
FIG. 2 is a view similar to FIG. 1 with the cover shown in the fully retracted position.

Referring initially to FIGS. 1 and 2, a cover 10 constructed in accordance with our invention is mounted to a conventional pickup truck 12. Truck 12 includes an open body or bed 14 (FIG. 2) defined by a flat bottom 16, two side walls 18 and 20, a front wall (not shown) and a tailgate 22 hingedly mounted to the rear end of the bottom 16. The cover 10 is moveable between an extended position as shown in FIG. 1 and a retracted position as shown in FIG. 2. In the retracted position, access to bed 14 is enabled, whereas, in the extended position, a strong cover is securely deployed across the opening defined by the side walls 18 and 20 and tailgate 22. An optional toolbox 24 is located at the front of the truck body over an enclosure 26 (FIG. 2).

The apparatus of the invention includes a cover assembly 40 comprised of a plurality of essentially planar, transversely elongated rectangular panels 42 linked to one another, as will be described below, and extending across the open bed 14. Panels 42 are slidably mounted in guides 44 and 46 of C-shaped cross section mounted to the upper portions of the side walls 18 and 20, respectively. Tailgate cover 48 is connected to the rear edge of the cover assembly 40 and is rotatably connected thereto for movements between a lowered position, as shown in FIG. 1, and a raised position, as shown in FIG. 2. In the lowered position, tailgate cover 48 engages the upper edge of the tailgate 22 to lock and prevent the opening thereof.

Figures 3, 8:
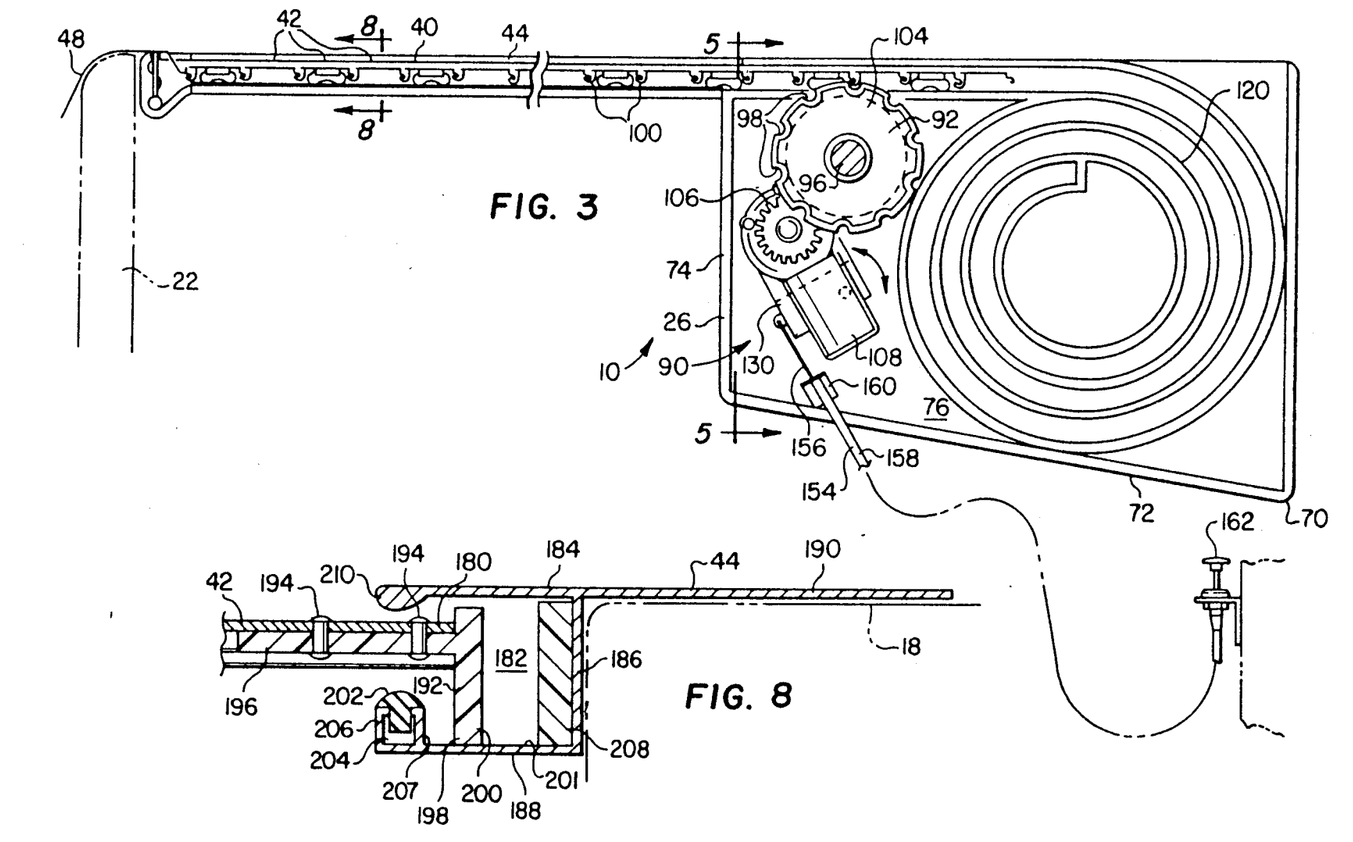
FIG. 3 is a sectional view taken along lines 3—3 of FIG. 5 showing the internal details of the cover apparatus.
FIG. 8 is a sectional view taken along lines 8—8 of FIG. 3.
Figure 4:
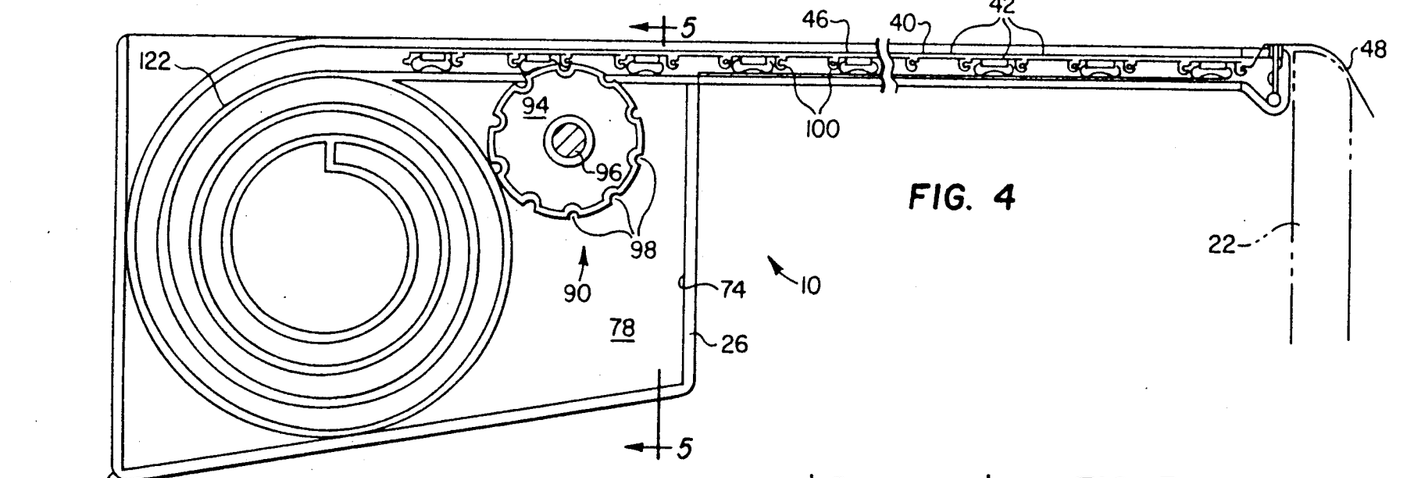
FIG. 4 is a sectional view taken along lines 4—4 of FIG. 5 similar to FIG. 3 but showing the opposite side of the apparatus.
Figure 5:
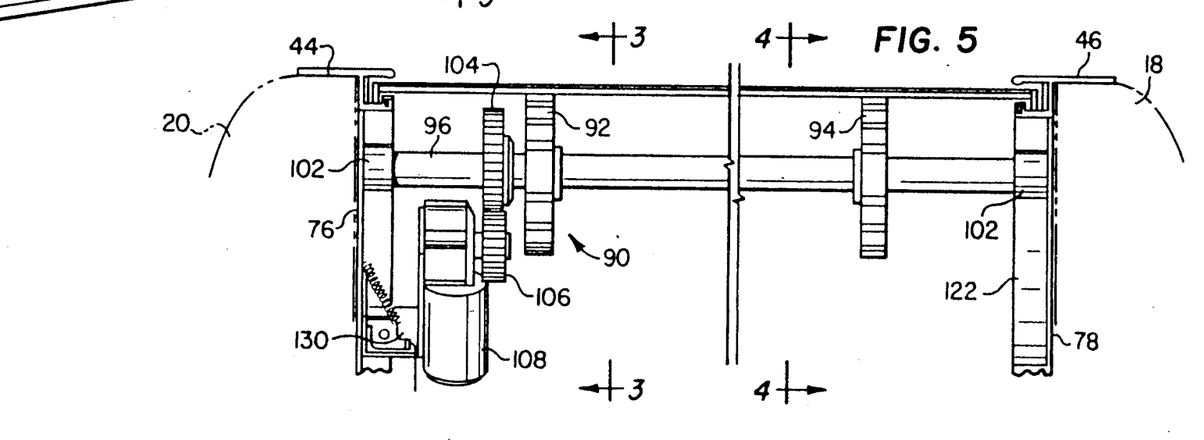
FIG. 5 is a sectional view taken along lines 5—5 of FIG. 4.

Referring now to FIGS. 3, 4 and 5, enclosure 26 includes a forward wall 70, a bottom wall 72 and a rear wall 74. A top wall may also be provided in the event the optional toolbox 24 shown in FIGS. 1 and 2 is not used over the enclosure 26. Guides 44 and 46 extend rearwardly from the side walls 76 and 78, respectively, of enclosure 26.

A drive mechanism 90 for driving the cover assembly 40 between the extended position and the retracted position includes rotatably mounted drive wheels 92 and 94 mounted for co-rotation on shaft 96. As shown in FIGS. 3 and 4, drive wheels 92 and 94 include notches 98 spaced about the outer circumferential surfaces thereof for engagement with depending portions 100 of cover assembly 40. Rotation of shaft 96 causes cover assembly 40 to translate either rearwardly or forwardly, depending on the direction of rotation of shaft 96. As shown in FIG. 5, shaft 96 is rotatably supported in bosses 102 formed in side walls 76 and 78 of the enclosure 26. The drive mechanism 90 further includes a driven gear 104 fixed for co-rotation with shaft 96. Driven gear 104 engages driving gear 106 when a unitary electric motor and transmission assembly 108 is in the position shown in FIGS. 3 and 5. Preferably, electric motor and transmission assembly 108 is of a conventional type typically used in automotive electric window raising and lowering mechanisms. Electric motor and transmission assembly 108 is wired into the electrical system of truck 12 by way of one or more three position switches (not shown), which allow the user to select the polarity of DC voltage applied to the motor and thereby select the direction of rotation or to select a de-energized position where no voltage is applied to the motor.

Electric motor and transmission assembly 108, in conventional fashion, includes a transmission having a suitably high reduction ratio such that drive gear 106 cannot be rotated by applying external force thereto. Thus, with drive gear 106 in engagement with driven gear 104, and wheels 92 and 94 in engagement with depending portions 100 of cover assembly 40, cover assembly 40 is effectively locked in position when drive mechanism 90 is de-energized.

Side walls 76 and 78 include inwardly-extending spiral walls 120 and 122, respectively. Spiral walls 120 and 122 are preferably formed of a molded low friction plastic, such as polypropylene, and define a spiral path for cover assembly 40 as it is retracted into enclosure 26. Spiral walls 120 and 122 receive panels 42, such that the fully retracted cover 40 is guided into the configuration shown schematically in FIG. 11. The relatively slight curvature required of cover assembly 40 is enabled by the utilization of the plurality of discrete, pivotally linked, rectangular panels 42, as described below.

Figures 6, 9A:
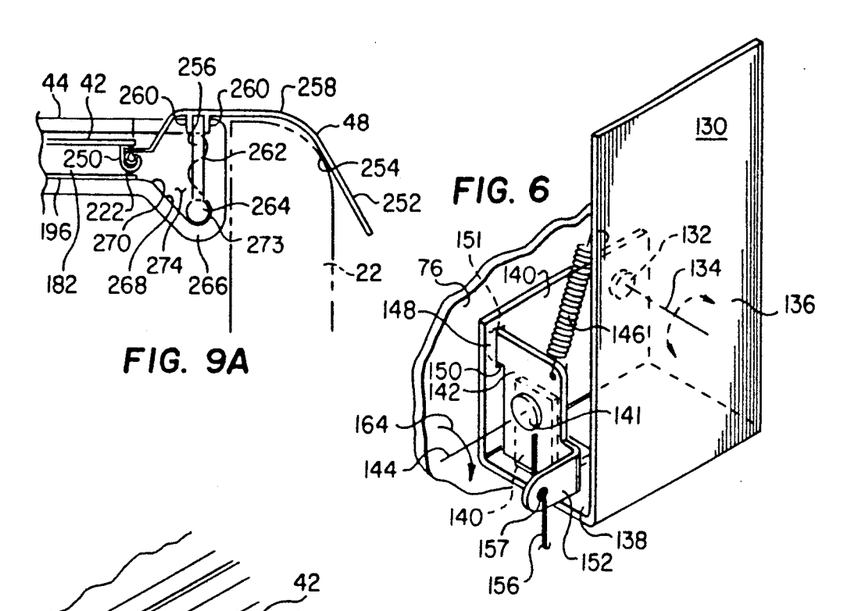
FIG. 6 is a partial perspective view of the disengagement mechanism for the cover assembly drive mechanism.
FIGS. 9A and 9B are schematic views illustrating the tailgate locking function.

Referring now to FIG. 6 in addition to FIGS. 3, 4 and 5, an optional feature of the cover apparatus provides manual disengagement of electric motor and transmission assembly 108 from the drive mechanism 90. As stated above, the high reduction ratio of the drive mechanism 90 causes the cover assembly 40 to be locked in place against movement under external forces when driving gear 106 is engaged with driven gear 104. Electric motor and transmission assembly 108 is mounted to side wall 76 by way of a bracket 130.

Bracket 130 is pivotally mounted to side wall 76 at pin and pivot point 132, such that bracket 130 is pivotal about axis 134. Bracket 130 is an essentially U-shaped member comprising an inner wall 136, a bottom wall 138 and an outer wall 140. Electric motor and transmission assembly 108 is fixed to inner wall 136 by way of suitable fasteners (not shown). A tang 140 extends upwardly from lower wall 138. Lock member 142 is pivotally mounted to tang 140 via pin 141 for rotation about axis 144. Axis 144 is perpendicular to axis 134. A spring 146 extends between inner wall 136 and lock member 142 to bias lock member 142 towards the position shown in FIG. 6. A finger 148 extends through a slot 150 formed in outer wall 140 to engage a corresponding opening 151 in side wall 76 of the enclosure. Engagement of finger 148 with side wall 76 maintains bracket 130 in place to maintain engagement of driving gear 106 and driven driven gear 104. Finger 152 extends perpendicularly from lock element 142 in a rearward direction. A Bowden cable 154 has its core wire 156 engaged with an aperture 157 in finger 152. The sheath 158 of cable 154 is fixed to side wall 76 by a bracket 160, as shown in FIG. 3. A conventional knob 162 is mounted at a convenient location, for example, inside the cab of truck 12.

When knob 162 is pulled, core wire 156 is withdrawn into sheath 158 and lock member 142 is rotated about axis 144 in the direction illustrated by arrow 164 in FIG. 6. As lock member 142 rotates, finger 148 becomes disengaged from side wall 76. Bracket 130 and the attached electric motor and transmission assembly 108 are then free to rotate about axis 134 in a downward direction a sufficient distance to disengage driving gear 106 from driven gear 104. In this disengaged condition, cover assembly 40 can be translated between the retracted and extended positions under external force, for example, by manually pushing on the cover. Re-engagement of drive mechanism 90 may be accomplished by pushing knob 162 or, alternatively, by manually rotating drive mechanism 90 to the position shown in FIG. 6 such that lock member 142 becomes re-engaged with side wall 76.

Figures 7, 9B:
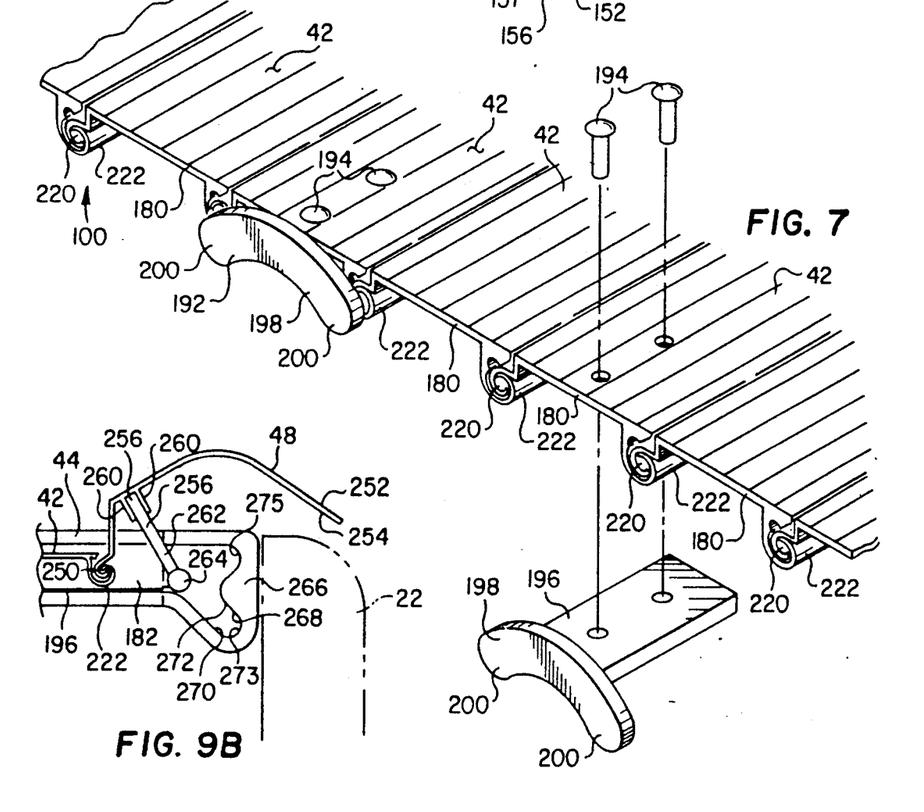
FIG. 7 is a partial exploded perspective view of the end portions of the cover panels.

Referring now to FIGS. 7 and 8, panels 42 include end portions 180 for engagement with guides 44 and 46 and spiral walls 120 and 122. In preferred form, panels 42 are aluminum extrusions of identical cross-section, and guides 44 and 46 are aluminum extrusions of identical cross-sectional dimension but are reversed in mirror-image fashion. FIGS. 7 and 8 illustrate a portion of track 44 and associated elements only, but it will be understood that like and corresponding structure is employed in connection with track 46 in mirror-image fashion.

As shown in FIG. 8, guide 44 includes a channel 182 which communicates with the interior space of the open body 14. Channel 182 is defined by an upper portion 184, a vertical portion 186 and lower portion 188. Upper portion 184 is co-extensive with a mounting portion 190 mounted to the top of side wall 18 by suitable fasteners (not shown). Vertical portion 186 and lower portion 188 depend from upper portion 184 such that channels 182 are located at a lower elevation than the upper portions of side walls 118. Slider elements 192 are fixed to alternate ones of end portions 180 of panels 42 by way of pop rivets 194. Each slider element 192 includes a mounting portion 196 and a slider portion 198. Preferably, each slider portion 198 is kidney-shaped (FIG. 7), being concave downwardly between two ends 200. Each end 200 rides upon an upwardly-facing low-friction slider surface 201 of lower portion 188. As shown in FIG. 8, a strip 202 engages an upwardly facing channel 204 formed by inner wall 206 and outer wall 207 facing upwardly from lower portion 188. Strip 202 provides a upwardly-facing low-friction guide finger surface, the function of which will be discussed below. In preferred form, strip 202 is formed from a plastic material having low friction characteristics such that a low friction surface is provided. Strip 202 extends over the entire length of guides 44 and 46. Another low-friction surface is provided by strip 208, which has a rectangular cross-section and is mounted in the innermost portion of channel 182 against vertical portion 186. Strip 208 controls side-to-side movements of the cover assembly. A lip 210 is formed along the innermost edge of upper portion 184 in order to minimize the gap between upper portion 184 and the top surfaces of the panels 42. Lip 210 thus serves to reduce the amount of moisture which could flow into channel 182.

Figure 11:
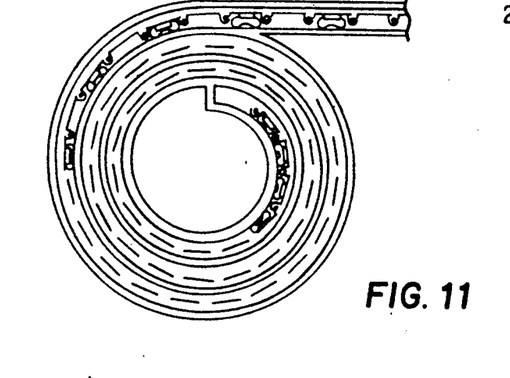
FIG. 11 is a schematic view of the cover assembly in the fully retracted mode within spiral walls in the enclosure.

As shown in FIG. 7, each panel 42 is linked to adjacent ones thereof by way of specially formed lateral edge portions. In preferred form, each panel 42 includes a first semi-cylindrical edge portion 220 engaged with a second semi-cylindrical edge portion 222 on the adjacent panel. Second semi-cylindrical edge portions 222 have a larger radius than the radius of the first edge portions 220, and the first edge portions 220 are concentric with, and rotatably received by, the second edge portions 222 of the adjacent panels. In preferred form, the second edge portions 222 also form the depending portions 100 which are driven by the drive mechanism 90 as described above. It is contemplated that other and equivalent linkage configurations could be utilized in the invention, but it is believed that the preferred embodiment provides an inexpensive yet strong cover assembly with reasonable moisture barrier properties. It will also be appreciated that the preferred configuration for linking the adjacent panels 42 enables curvature of the cover assembly in an inward direction as shown in FIG. 11 but prevents curvature of the cover in an outward direction, such outward direction curvature not being required for operation of the apparatus.

Referring to now to FIGS. 9A, 9B, 10A and 10B, tailgate cover 48 includes a semi-cylindrical edge portion 250 engaged with the second edge portion 222 of the last most rearwardly mounted panel 42. This enables tailgate cover 48 to be rotated from the lowered position shown in FIGS. 9A and 10A to the raised position shown in FIGS. 9B and 10B. In the lowered position, cover portion 252 of tailgate cover 48 engages the upper portion of the tailgate 22 by way of a rearwardly and downwardly extending surface 254. It will be appreciated that tailgate 22 is locked in position by the prevention of rotation provided by cover portion 252, and no additional latching mechanism is required.

Figure 10A:
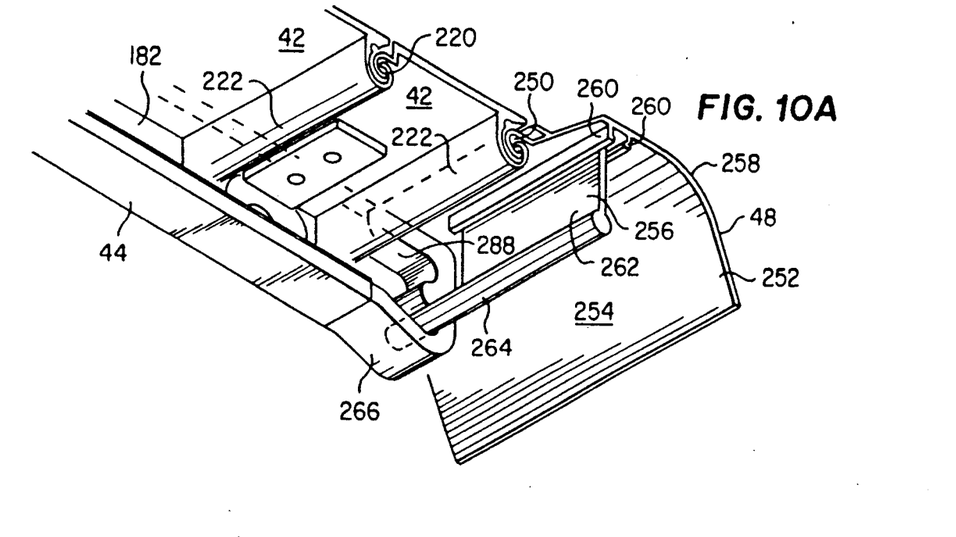
FIGS. 10A and 10B are partial perspective views illustrating the tailgate locking function.
Figure 10B:
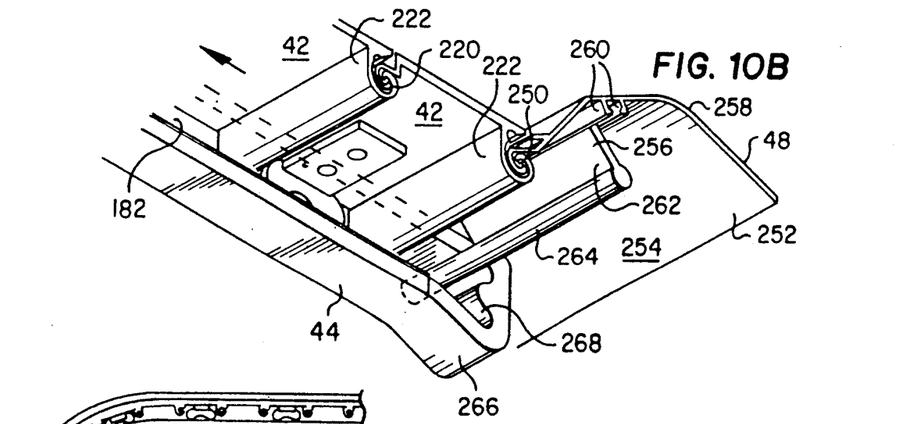

At least one support 256 depends from a support portion 258 of tailgate cover 48, being rigidly attached thereto by way of downwardly extending walls 260. Support 256 includes a support portion 262 and terminates at a cylindrical guide finger 264, the guide finger 264 extending outwardly into the channel 182 of the adjacent guide 44. The dimensions of support portion 262 are selected such that when the cover assembly is being translated between the retracted and extended positions, or is stopped in any position other than the fully extended position, guide finger 262 is supported by and rides along slider support surface 206 of strip 202 and causes tailgate cover 48 to be deployed in the raised position In the raised position, cover portion 254 is sufficiently raised to clear the end of tailgate 22 and the guides 44 and 46. A pocket member 266 (FIG. 9B) is provided at the end of guide 44. Pocket member 266 includes a curved inner wall 268 defining a downwardly and rearwardly sloping lower pocket surface 270 joined to and spaced apart from an upwardly and forwardly upper pocket surface 272 by a semi-cylindrical pocket surface 273, which three pocket surfaces define a pocket channel 274. As the cover moves into the fully extended position, guide finger 264 rides down surface 270 into pocket channel 274, as shown in FIGS. 9A and 10A. Surface 272 prevents upward rotation of tailgate cover 48 when the cover is fully extended and the tailgate cover is in the fully lowered position. An upper pocket-shaped area 275 is provided to save weight, and has no other purpose. In preferred form, an optional second support 256 and pocket member 266 are provided in connection with guide 46 in mirror-image fashion to enhance the locking function. The guide figure extends outwardly into a channel of an adjacent guide in context the low-friction surface of strip 202 when the cover assembly is retracted and the pocket of the pocket member when the cover assembly is fully extended, such that the tailgate cover is maintained in the raised position when the guide finger is in contact with the low-friction surface of strip 202. The spiral tracks are aligned with the channels of the guides to receive the end portions of the panels as they are translated forwardly into the retracted position.

In operation, the cover of the present invention is electrically operable to be moved between the extended and retracted positions, with the tailgate being automatically locked when the cover is fully extended. The provision of an electric drive means enables both the remote operation of the cover and the prevention of movement when the drive means is de-energized, due to the high reduction ratio of the drive mechanism. The drive mechanism includes a readily available electric motor/transmission assembly used in other automotive applications, and substantially all of the other components of the cover, enclosure and drive mechanism are simple and easily manufactured by conventional plastic-forming and aluminum extruding techniques. Utilization of the spiral walls to store the cover in the retracted mode enables retraction of the cover free of excessive frictional resistance, and prevents damage to the cover panels by overrotation or binding. In the event of a power failure or other condition preventing operation of the drive mechanism, knob 162 connected to cable 154 may be pulled, thereby allowing disengagement of the drive mechanism and manual movement of the cover. Preferably, knob 162 will be located in the interior of the vehicle cab, so that unintended access to the bed is prevented when the cab locked. When the cover is in the fully extended position, access to the vehicle bed is prevented, short of actual destruction of the cover assembly or the tailgate cover. Thus, while the bed of the truck cannot be made secure against all unintended access, the cover is certainly sufficient to prevent casual, undetected access.

The apparatus herein illustrated and described constitutes the preferred embodiment of our invention, and we have therefore described the same in detail with a view to imparting an exact understanding of both structure and mode of operation. We do not desire, however, to be understood as confining ourselves to the specific construction and relative arrangement of parts as disclosed, our invention being defined by our appended claims, within the scope of which modifications in structure and relative arrangement of parts may be made without departure from our invention.

We claim:

1. A sliding cover, for use with a pickup truck having an open body consisting of a cab, a flat bottom, two side walls, a front wall, and a tailgate hingedly mounted to a rear end of the bottom, comprising:

a pair of guides mounted on upper portions of the side walls of the open body, said guides comprising a left and a right channel of C-shaped cross section having lengthwise channels communicating with an interior space of the open body;

a cover assembly including a plurality of essentially planar, transversely elongated, rectangular panels successively disposed adjacent to and linked to one another and extending across the open body, the said panels having end portions slidably mounted in said channels;

an enclosure mounted at a forward end of the open body for receiving and storing said cover assembly in a fully retracted position thereof;

drive means with said enclosure for translating the cover assembly between a fully extended position wherein the open body is substantially covered and the fully retracted position thereof wherein the open body is substantially uncovered; and tailgate-engaging means connected to the cover assembly for maintaining the tailgate in a closed and locked condition when the cover assembly is in the fully extended position thereof, the tailgate-engaging means including a tailgate cover having a cover portion for engaging and restraining an upper portion of the tailgate when the cover assembly is in the extended position thereof, the tailgate cover being rotatable between a raised position and a lowered position, the cover portion including a rearwardly and downwardly extending surface for engaging and restraining the upper portion of the tailgate when the tailgate cover is in the lowered position thereof, the cover further comprising guide means for rotating the tailgate cover between the raised and lowered positions thereof, wherein the guide means includes a support fixed to the tailgate cover and a surface in contact with the support to cause rotation of the tailgate cover as the cover assembly is translated to the extended position thereof.

2. The cover of claim 1 wherein a pocket member is fixed to a rearmost end of one of the guides, the pocket member including a downwardly and rearwardly sloping lower pocket surface, and the support includes a guide finger for contacting the pocket surface and allowing rotation of the tailgate cover as the cover assembly approaches the extended position.

3. The cover of claim 2 wherein the pocket member further comprises an upper pocket surface joined to and spaced apart from the lower pocket surface to prevent rotation of the tailgate cover when the cover assembly is in the extended position.

4. The cover of claim 3 wherein the guide finger contacts an upwardly-facing low-friction guide finger surface in the adjacent guide channel.

5. A cover for a truck, the truck having an open body, the cover being movable between retracted and extended positions and comprising:

a pair of guides mounted on upper portions of side walls of said open body of said truck, the guides comprising left and right extruded aluminum track of C-shaped cross section having lengthwise channels communicating with an interior space of the open body, upper portions of the channels being co-extensive with mounting portions of the guides, with vertical and lower portions of the channels depending from the upper portions of the channels such that the channels are located at a lower elevation than the upper portions of the side walls of said open body, the guides including first and second low-friction sliding surfaces facing upwardly from the lower portion of each channel, and a rear portion of at least one channel terminating with a pocket member having a downwardly and rearwardly sloping surface and an upwardly and forwardly sloping surface defining a pocket;

a cover assembly including a plurality of essentially planar, transversely elongated, rectangular panels successively disposed adjacent to one another and extending across said open body, the panels having end portions engaged with said channels for slidable movements relative thereto by way of slider elements fixed to alternate ones of the end portions for sliding movements upon the first low friction surfaces of the channels, each panel having a first semi-cylindrical edge portion and a second semi-cylindrical edge portion having a radius larger than a radius of the first edge portion, said first edge portion being concentric with, and rotatably received by, said second edge portion of the adjacent panel;

a tailgate cover having a semi-cylindrical forward edge portion being concentric with, and rotatably received by, said second edge portion of a rearmost panel for movements between a raised position and a lowered position, said tailgate cover further including at least one support depending from a lower surface thereof and terminating at a guide finger, said guide finger extending outwardly into, the channel of an adjacent guide and contracting the pocket of the pocket member when the cover assembly is fully extended, such that the tailgate cover is rotated to the lowered position when the guide finger engages the pocket of the pocket member, with the tailgate cover further including a cover portion having a rearwardly and downwardly extending surface for engaging an upper portion of the tailgate when the tailgate cover is in the lowered position;

an enclosure member for enclosing the cover assembly in the retracted position, the enclosure assembly including side walls having left and right inwardly extending spiral walls defining spiral tracks for receiving the end portions of the panels, the spiral tracks being aligned with the channels of the guides to receive the end portions of the panels as they are translated forwardly into the retracted position;

a drive mechanism for driving the cover assembly between the extended position and retracted position including at least one rotatably mounted drive wheel engaged with the panels of the cover assembly, the drive wheel being driveable by way of an electric motor and transmission mechanism to selectively transport the cover assembly between the retracted and extended positions, the electric motor and transmission mechanism being effective to limit motion of the cover assembly when the electric motor is deenergized; and disengagement means for selectively disengaging the electric motor from the drive mechanism to enable movements of the cover between the retracted and extended positions without assistance from the electric motor.

* * * * *